(12) United States Patent
Komatsu

(10) Patent No.: US 12,135,074 B1
(45) Date of Patent: Nov. 5, 2024

(54) ELECTROMAGNETIC ACTUATOR FOR DRIVETRAIN SYSTEM

(71) Applicant: GKN Automotive Limited, Birmingham (GB)

(72) Inventor: Toshiaki Komatsu, Commerce Township, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/518,661

(22) Filed: Nov. 24, 2023

(51) Int. Cl.
F16H 48/24 (2006.01)
F16H 48/34 (2012.01)

(52) U.S. Cl.
CPC ....... *F16H 48/24* (2013.01); *F16H 2048/346* (2013.01)

(58) Field of Classification Search
CPC .... F16H 48/24; F16H 2048/346; F16H 48/34; H01F 7/16
See application file for complete search history.

(56) References Cited

U.S. PATENT DOCUMENTS

| | | | |
|---|---|---|---|
| 3,300,008 A | 1/1967 | Mendenhall | |
| 4,733,577 A | 3/1988 | Griesser et al. | |
| 7,247,118 B2 | 7/2007 | Haruki et al. | |
| 7,892,134 B2 | 2/2011 | Fusegi | |
| 8,695,456 B2 | 4/2014 | Fox et al. | |
| 9,970,525 B2 | 5/2018 | Zaers et al. | |
| 2002/0155913 A1* | 10/2002 | Fusegi | F16H 48/30 192/84.92 |
| 2006/0160651 A1 | 7/2006 | Petruska et al. | |
| 2007/0054771 A1 | 3/2007 | Fusegi | |
| 2007/0179008 A1 | 8/2007 | Fusegi et al. | |
| 2011/0105264 A1 | 5/2011 | Maruyama et al. | |
| 2015/0316110 A1 | 11/2015 | Oram et al. | |
| 2016/0223064 A1 | 8/2016 | Yamanaka et al. | |
| 2017/0002875 A1 | 1/2017 | Beesley et al. | |
| 2017/0254399 A1 | 9/2017 | Onitake et al. | |
| 2017/0297428 A1 | 10/2017 | Inose et al. | |
| 2021/0317902 A1* | 10/2021 | Komatsu | F16H 48/24 |

FOREIGN PATENT DOCUMENTS

| | | |
|---|---|---|
| CN | 1661263 A | 8/2005 |
| CN | 1924386 A | 3/2007 |
| CN | 103261746 A | 8/2013 |
| CN | 103659163 A | 3/2014 |

(Continued)

*Primary Examiner* — Tisha D Lewis
(74) *Attorney, Agent, or Firm* — Reising Ethington P.C.

(57) ABSTRACT

A rotary power transmission device includes a device housing having an interior in which multiple gears are received for rotation, a clutch received within the device housing and having a clutch ring selectively engageable with one of the multiple gears, and an actuator having a coil and a plunger driven for movement along an axis and relative to the clutch ring. The plunger has a first position and a second position in which the clutch ring is engaged with one of the multiple gears. The plunger includes a first body formed at least partially from a magnetically responsive material, and includes a radially outer surface, a radially inner surface and a front face that is axially variable and arranged so that a radially outer portion of the front face is axially forward of a radially inner portion of the front face.

18 Claims, 6 Drawing Sheets

(56) References Cited

FOREIGN PATENT DOCUMENTS

| | | | | |
|---|---|---|---|---|
| CN | 105960551 A | | 9/2016 | |
| CN | 107110328 A | | 8/2017 | |
| JP | 2003206915 A | | 7/2003 | |
| JP | 2003322240 A | * | 11/2003 | ............. B60K 23/04 |
| JP | 2004100924 A | * | 4/2004 | ............. F16D 27/10 |
| JP | 2004183874 A | | 7/2004 | |
| JP | 2007092990 A | | 4/2007 | |
| JP | 2007315583 A | | 12/2007 | |
| JP | 2010133518 A | | 6/2010 | |
| JP | 2013119903 A | | 6/2013 | |
| JP | 2015102185 A | | 6/2015 | |
| JP | 2017067257 A | | 4/2017 | |
| WO | WO2015132897 A1 | | 9/2015 | |
| WO | WO2016035129 A1 | | 3/2016 | |
| WO | WO2016135826 A1 | | 9/2016 | |

* cited by examiner

ELECTROMAGNETIC ACTUATOR FOR DRIVETRAIN SYSTEM

TECHNICAL FIELD

The present disclosure relates generally to an electromagnetic actuator for drivetrain systems, such as clutches, differentials and axle disconnect assemblies, by way of non-limiting examples.

BACKGROUND

Electromagnetic actuators may be used to linearly actuate a device, like a clutch. The space allotted for the actuators is small, and the response time and forces required are difficult to attain without significantly increasing component size and weight, which is undesirable.

SUMMARY

In at least some implementations, a rotary power transmission device includes a device housing having an interior in which multiple gears are received for rotation, a clutch received within the device housing and having a clutch ring selectively engageable with one of said multiple gears, and an actuator having a coil and a plunger driven for movement along an axis and relative to the clutch ring. The plunger has a first position in which the clutch ring is not engaged with said one of said multiple gears, and the plunger has a second position in which the clutch ring is engaged with said one of said multiple gears. The plunger includes a first body formed at least partially from a first material that is magnetically responsive and a second body formed at least partially from a second material, and wherein the first body includes a radially outer surface, a radially inner surface and a front face that is axially variable and arranged so that a radially outer portion of the front face is axially forward of a radially inner portion of the front face.

In at least some implementations, the device housing includes an axially extending surface arranged radially between the coil and the radially outer surface and axially overlapping at least part of the radially outer surface in all positions of the plunger. In at least some implementations, the front face of the first body includes a nose portion that extends to the front face from a transition spaced axially from the front face, and wherein the radially outer surface in the nose portion is inclined toward the radially inner surface so that the radial dimension of the first body decreases from the transition to the front face, and wherein a gap between the radially outer surface and the axially extending surface decreases as the plunger moves toward the second position.

In at least some implementations, the front face of the first body includes a nose portion that extends to the front face from a transition spaced axially from the front face, and wherein the radially outer surface in the nose portion is inclined toward the radially inner surface so that the radial dimension of the first body decreases from the transition to the front face.

In at least some implementations, the device housing includes a recess defined by an end wall, and wherein the front face of the first body is received in the recess when the plunger is in the second position. In at least some implementations, the end wall has a radially inner surface and a radially outer surface that is axially offset from the radially inner surface. In at least some implementations, the end wall defines part of a groove that extends circumferentially in the device housing. In at least some implementations, the device housing includes an annular surface and the plunger includes a radially inner surface that is adjacent to and that slides along the annular surface when the plunger moves to and between the first position and the second position, and wherein the recess is radially offset from the annular surface.

In at least some implementations, the second body includes axially extending feet having an axial end arranged to engage the clutch ring and the nose portion is axially spaced from the axial end of the feet so that the nose portion does not engage the clutch ring.

In at least some implementations, the nose portion is radially tapered at an angle between 0.5 degrees and 30 degrees. In at least some implementations, the front face is axially inclined at an angle between 0.1 degrees and 45 degrees relative to a radius extending to the radially outermost portion of the front face.

In at least some implementations, a rotary power transmission device, includes a device housing, a clutch and an actuator. The device housing has an interior in which multiple gears are received for rotation, an annular surface and an axially extending surface arranged radially spaced from the annular surface. The clutch is received within the device housing and has a clutch ring selectively engageable with one of said multiple gears. The actuator has a coil and a plunger driven for movement along the annular surface and having an axis. The plunger is driven relative to the clutch ring and the plunger has a first position in which the clutch ring is not engaged with said one of said multiple gears, and the plunger has a second position in which the clutch ring is engaged with said one of said multiple gears. The plunger includes a first body formed at least partially from a first material that is magnetically responsive and a second body coupled to the first body and slidable along the annular surface. The first body includes a radially outer surface, a radially inner surface and a front face that is axially variable and arranged so that a radially outer portion of the front face is axially forward of a radially inner portion of the front face, and the axially extending surface axially overlaps at least part of the radially outer surface of the plunger in at least some positions of the plunger.

Various features and components may be combined together except where they are mutually exclusive, in accordance with the description below, which is intended to illustrate the various features rather than limit the inventions described herein.

BRIEF DESCRIPTION OF THE DRAWINGS

The following detailed description of preferred embodiments and best mode will be set forth with reference to the accompanying drawings, in which.

DETAILED DESCRIPTION

Figure 1:
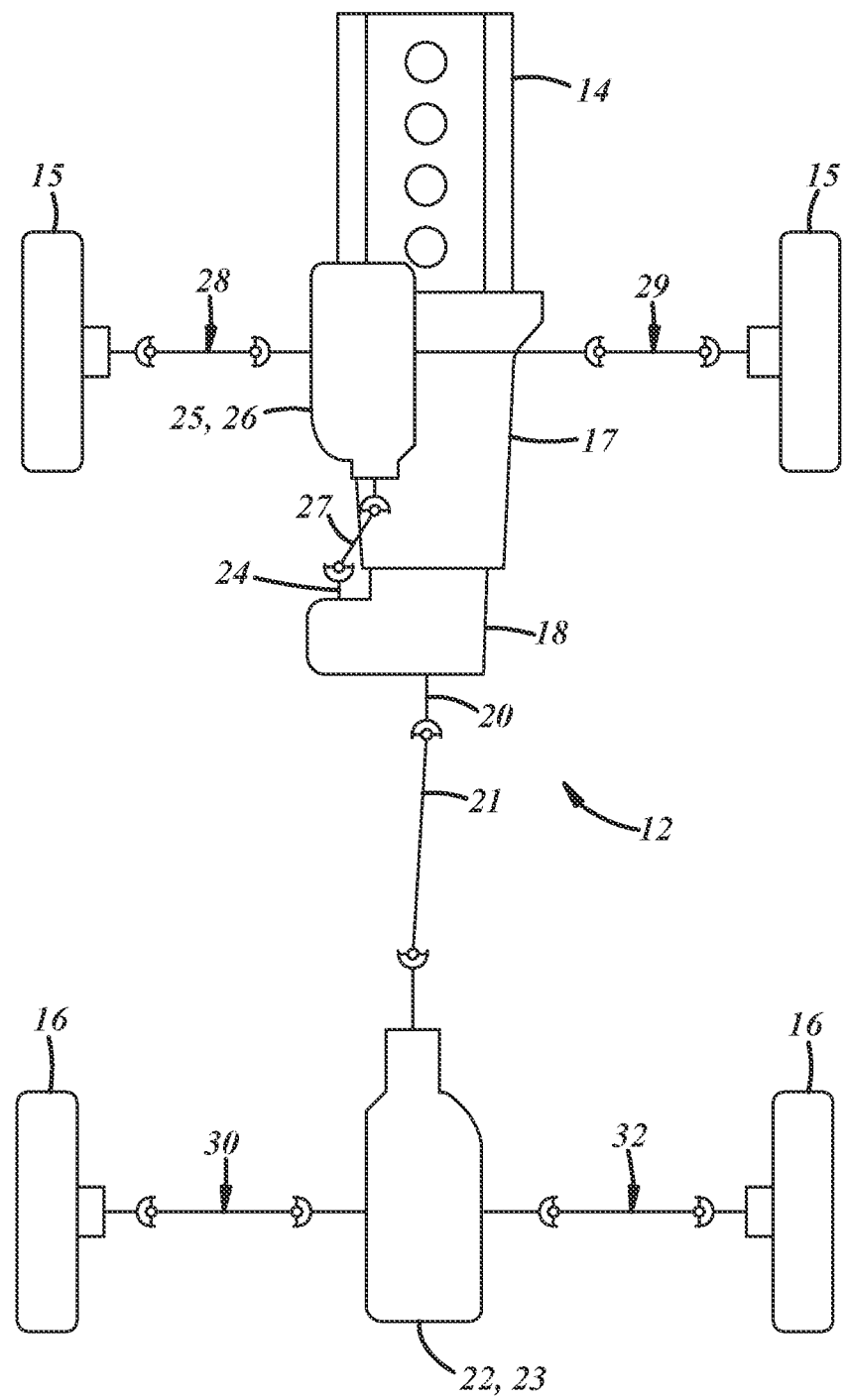
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16.

Of course, other driveline configurations may be used, as desired. For example, while shown in rear drive-based driveline, lockup differentials can also be used in front based all-wheel drive system, or even in two-wheel drive front engine/front wheel drive or front engine/rear wheel drive drivetrains, as well as in an e-axle (e-motor driven final drive unit). This disclosure is not limited to a drivetrain configuration and the devices described herein can be used in a wide range of components like clutches, axle/shaft disconnect assemblies, differentials and the like.

Figure 2:
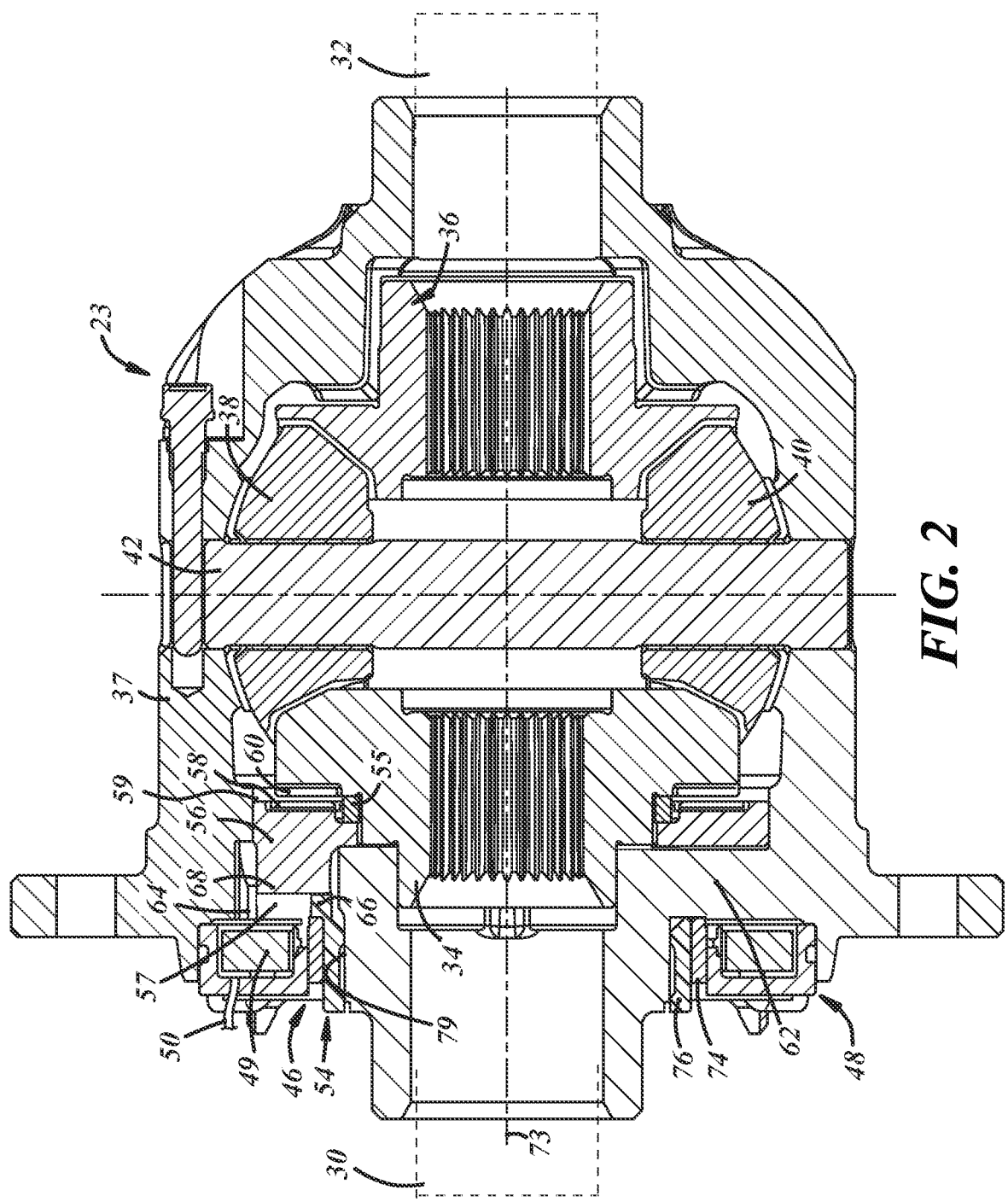
FIG. 2 is a cross-sectional view of a differential with an electrically actuated locking mechanism, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The side gears 34, 36 are carried within a housing 37 of the differential 23 (which may be called a differential housing or device housing). The differential also includes pinion gears 38, 40 that are meshed with side gears 34, 36, respectively, and which are mounted within the housing 37 on a pinion shaft 42.

To selectively lock and unlock the differential 23 a clutch assembly 46 is provided. The clutch assembly 46 may have actuated and deactuated states, and in one state the clutch assembly couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the clutch assembly 46 is electrically actuated and includes an actuator having a solenoid 48 with an annular wire coil 49 and a drive member that may include an armature or plunger 54 (FIGS. 2, 3, 10 and 11) received at least partially radially inwardly of and axially overlapped with the coil. In at least some implementations, the plunger 54 is also annular, the plunger and coil 49 are coaxially arranged and carried by the housing 37 for rotation with the housing, and one side shaft (here, the second side shaft 32) extends coaxially through a portion of the housing 37 that extends through the coil and plunger. Electric power is supplied to the coil 49 via a power wire 50 to generate a magnetic field that displaces the plunger 54 relative to the coil and differential housing 37 from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the clutch assembly 46 is actuated when the plunger 54 is in the second position and the clutch assembly is deactuated when the plunger is in the first position. While in the example shown the plunger 54 is in its second position when power is provided to the coil 49 and the plunger moves to the first position when power is not supplied to the coil, the opposite could be true if desired (e.g. the clutch assembly 46 could be moved to the actuated position by the biasing member 55 and deactuated by powering the coil).

In at least some implementations, the clutch assembly 46 may further include or be associated with a clutch member, called herein a clutch ring 56 adapted to be driven by the plunger 54 and to interface with the side gear 34 as set forth below. The clutch ring 56 may be annular and a portion of the second side gear 36 and/or shaft 32 may extend through the clutch ring. The clutch ring 56 may include a rear face 57 engageable by the plunger 54 and a front face 59 having at least one engagement feature 58, such as gear or clutch teeth 58 (e.g. dog clutch teeth) configured to engage a corresponding engagement feature 60 (e.g. gear or dog clutch teeth) formed on a rear face of the first side gear 34. The spring 55 may act on the clutch ring 56 to urge the clutch ring into the plunger 54 and move the plunger to its first position when the coil 49 is not powered, as noted above. In the implementation shown, the plunger 54 is located adjacent to one side of a housing wall 62 and the clutch ring 56 is located adjacent to the other side of the wall 62. The wall 62 includes apertures 64, and the plunger 54 and clutch ring 56 include axially extending feet 66, 68, respectively, that extend into or through the apertures 64 in the wall so that the plunger and clutch ring are engaged with each other across or through the wall. Like the coil 49 and plunger 54, the clutch ring 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the clutch ring 56 is not engaged with the side gear 34 so that the side gear can rotate relative to the clutch ring 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the clutch ring 56 into engagement with the side gear 34 (i.e. teeth 58 engage and mesh with teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison. While shown with regard to a locking differential, the clutch and actuator arrangement described herein may be used in other devices wherein a linear actuator may be useful, including with friction clutches and disconnect assemblies and in combustion engine, electric and hybrid drivetrains, as desired.

As shown in FIGS. 2-4, 8-11, the plunger 54 may be formed from multiple materials including a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced.

Figure 3:
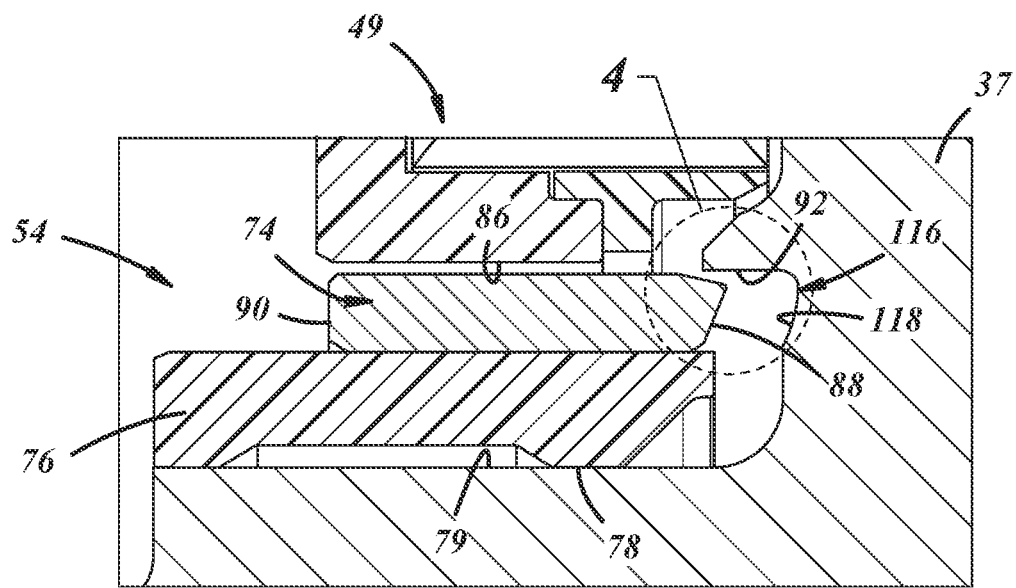
FIG. 3 is a fragmentary view of a portion of the differential including a plunger.
Figure 11:
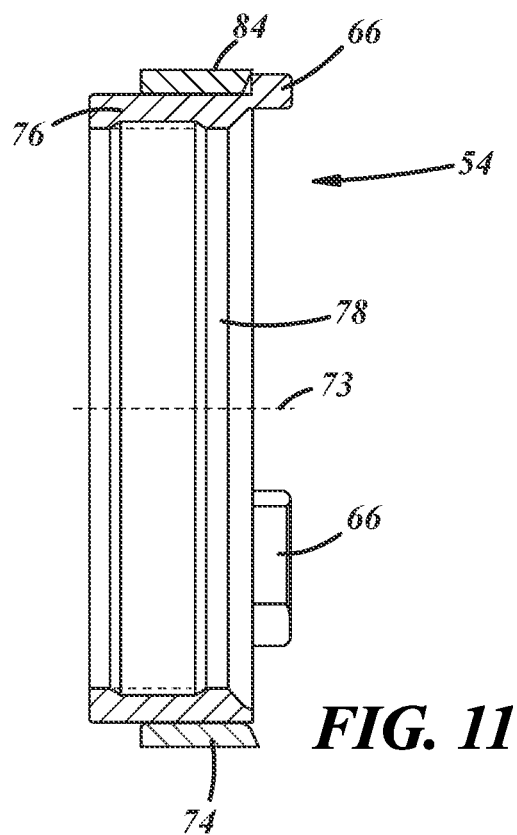
FIG. 11 is a side sectional view of the plunger.

In at least some implementations, as shown for example in FIGS. 2, 3 and 11, the plunger 54 includes a main body with a central axis 73 (shown in FIGS. 2 and 11) and which may be defined by a first body 74 and a second body 76 that are coupled together and move as one unit or component and are not separated during use. The first body 74 may be formed from a magnetically responsive material and may be received adjacent to and radially inwardly of the coil 49, with a small air gap between them. The second body 76 may have at least a portion that is radially inward of at least a portion of the first body 74. The second body 76 may be annular and may, in at least some implementations, radially overlap part of the first body 74. The second body 76 may be conveniently overmolded onto the first body 74 to facilitate forming the second body and connecting together the first and second bodies, however other forming processes such as but not limited to casting, stamping or extruding may be used. The second body 76 may define part or all of the feet 66 of the plunger 54 which may extend axially beyond the first body 74 to an axial end of the feet 66 arranged to engage the clutch ring 56. The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 54 when the coil 49 is energized. In this way, the magnetic field is more concentrated or stronger in the area of the first body 74 to increase the magnetic flux at or in the first body and improve the responsiveness of the plunger 54 to the generated magnetic field.

As shown in FIG. 3, the second body 76 may have a radially inner surface 78 that is received adjacent to or around an annular surface 79 of the differential housing 37. The inner surface 78 may define a pilot diameter for receipt of the plunger 54 over the annular surface 79 of the differential housing 37 for guided, sliding axial movement of the plunger relative to the differential housing.

Figure 4:
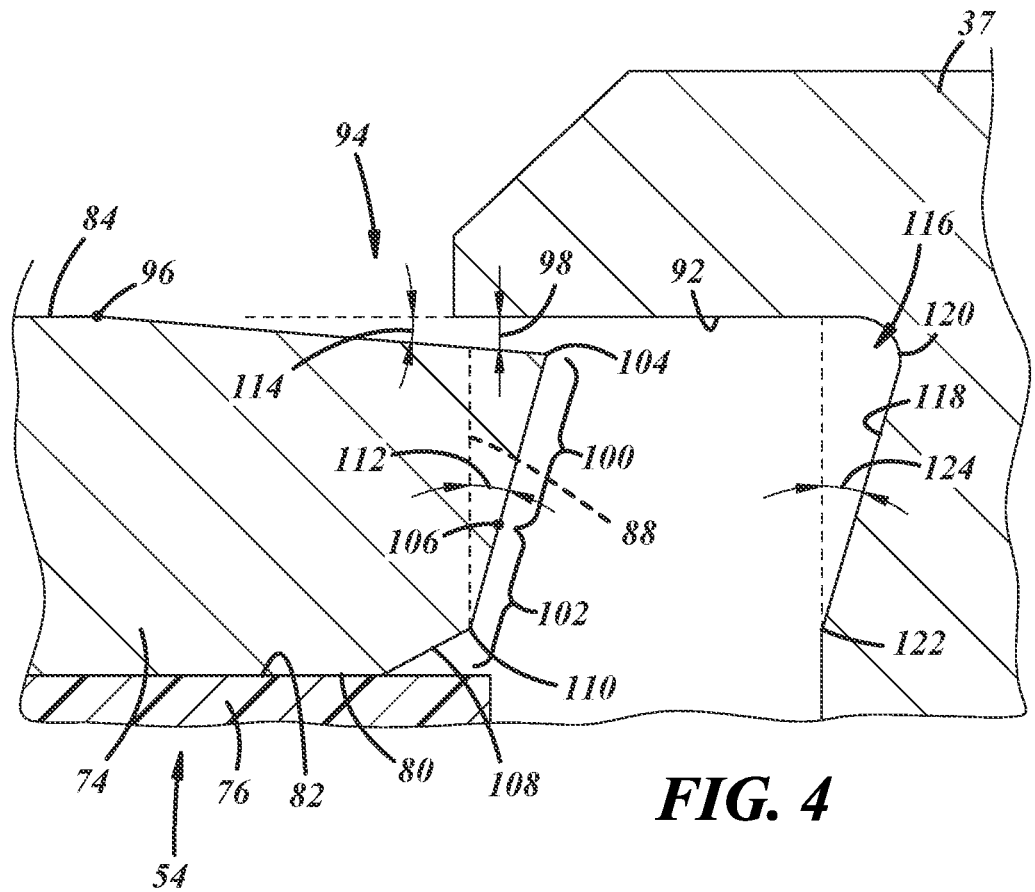
FIG. 4 is an enlarged fragmentary view of a portion of the plunger and a portion of a housing of the differential.

As shown in FIG. 4, the first body 74 has a radially inner surface 80 adjacent to a radially outer surface 82 of the second body 76, a radially outer surface 84 that is the closest part of the plunger 54 to a radially inner surface 86 (FIG. 3) of the coil 49, a front face 88 at a first axial end that is closer to the clutch ring 56, and a rear face 90 (FIG. 3) at a second axial end opposite to the first end. The front face 88 may define an axial end of the plunger 54 in the circumferentially extending areas between the feet 66 of the second body 76. The outer surface 84 of the first body 74 is the closest part of the plunger 54 to the radially inner surface 86 of the coil 49. The outer surface 84 also is adjacent to an axially extending surface 92 of the differential housing 37. In at least some implementations, the axially extending surface 92 is received between the coil 49 and part of the first body 74, and may axially overlap part of the first body 74 including at least part of the front face 88. In this way, the axially extending surface 92 may be part of a flux path for the magnetic field generated by the coil 49 and acting on the first body 74 to drive the first body 74 between the first position and second position.

Figure 5:
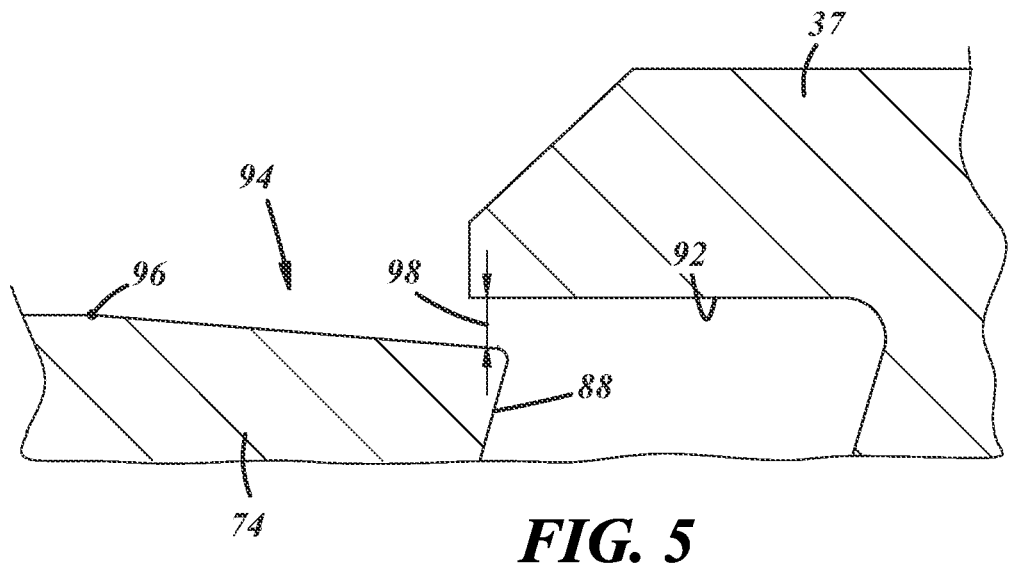
FIGS. 5, 6 and 7 show the plunger in a first position, intermediate position and second position.
Figure 6:
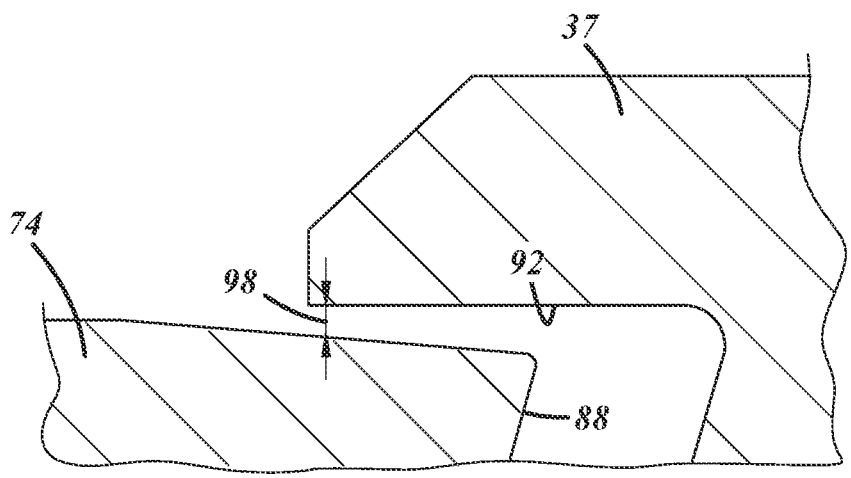
Figure 7:
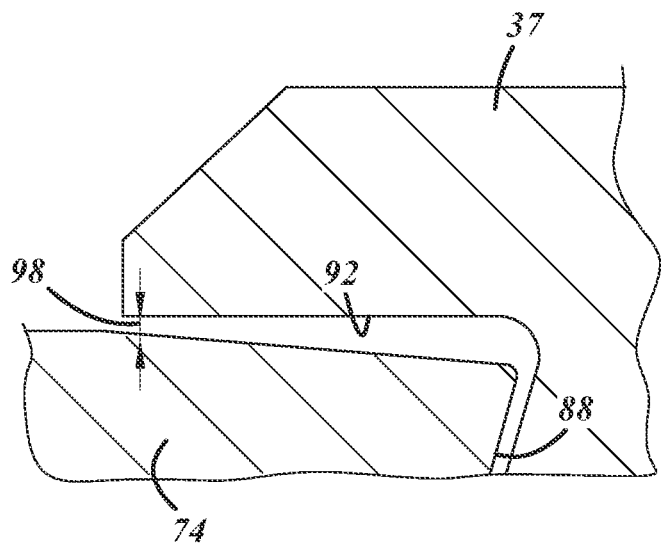

In at least some implementations, the first body 74 includes a nose portion 94 that is tapered to provide a reduced outer diameter from a transition 96 at the start of the nose portion 94 to the front face 88 (where from the transition 96 to the rear face 90 may be at a constant diameter, if desired). The tapered outer surface 84 in the nose portion 94 provides an air gap 98 between the axially extending surface 92 of the housing 37 and the first body 74 that decreases as the first body 74 is moved toward the second position in which there is a greater extent of overlap between the first body 74 and the axially extending surface 92 than in the first position. This is shown, by way of a non-limiting example, in FIGS. 5, 6 and 7 which show the plunger in the first position (FIG. 5), an intermediate position (FIG. 6) and in the second position (FIG. 7), with the gap decreasing in radial dimension as the plungers moves from the first to the second position. In this way, as the plunger 54 is advanced toward the clutch ring 56, the force that the magnetic field provides on the first body 74 increases to facilitate displacement of the plunger 54 and clutch ring 56, and to increase the rate of displacement to improve the response time of the device, and to provide a higher force as the plunger engages and drives the clutch ring 56.

Figure 8:
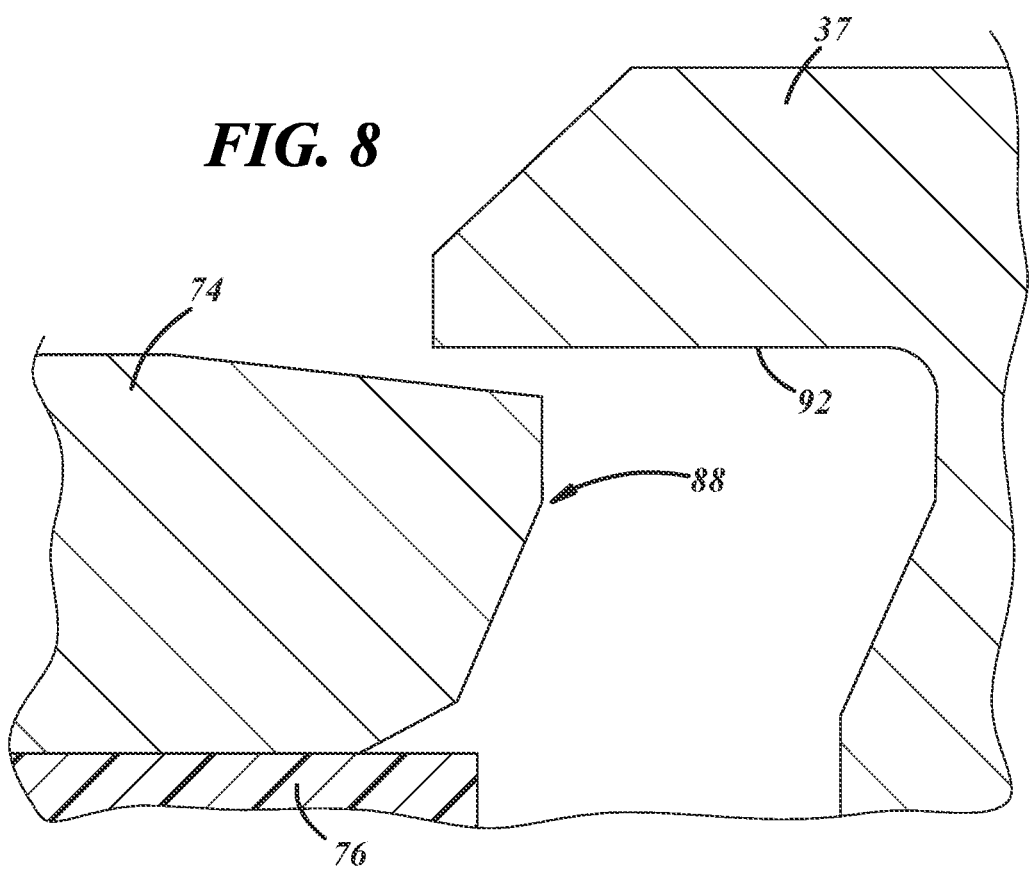
FIG. 8 shows a plunger with an alternately shaped first body and a corresponding portion of a differential housing.
Figure 9:
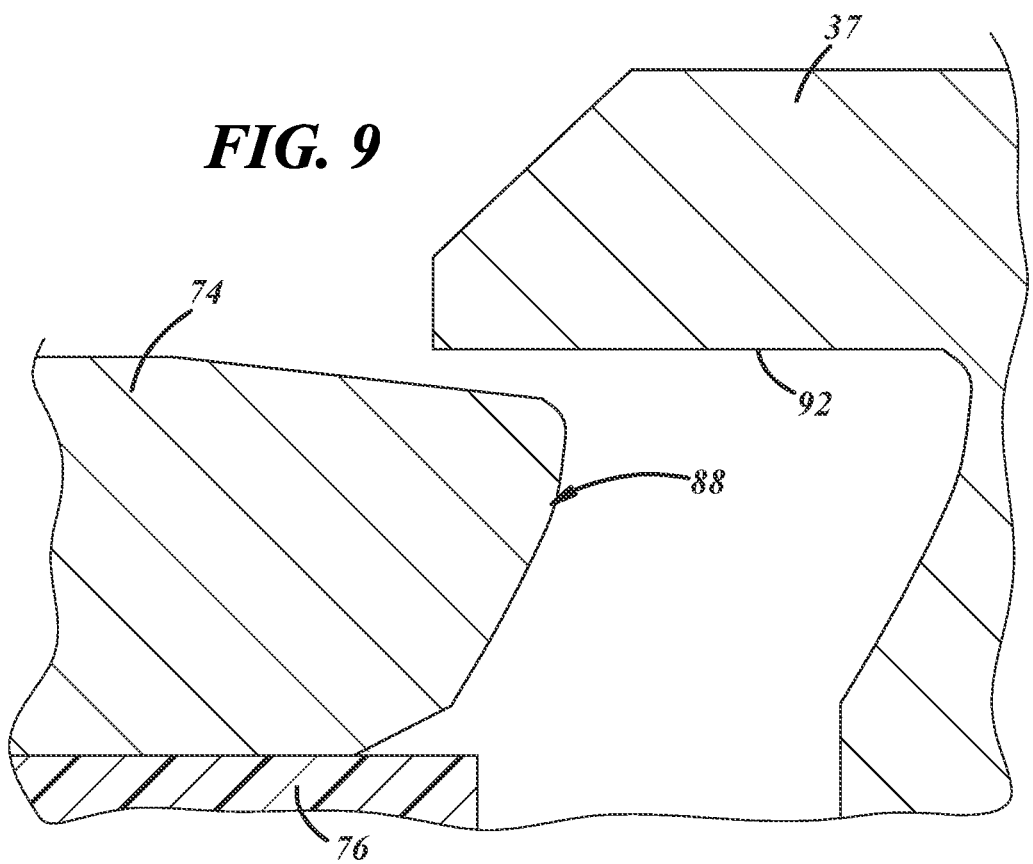
FIG. 9 shows a plunger with an alternately shaped first body and a corresponding portion of a differential housing.
Figure 10:
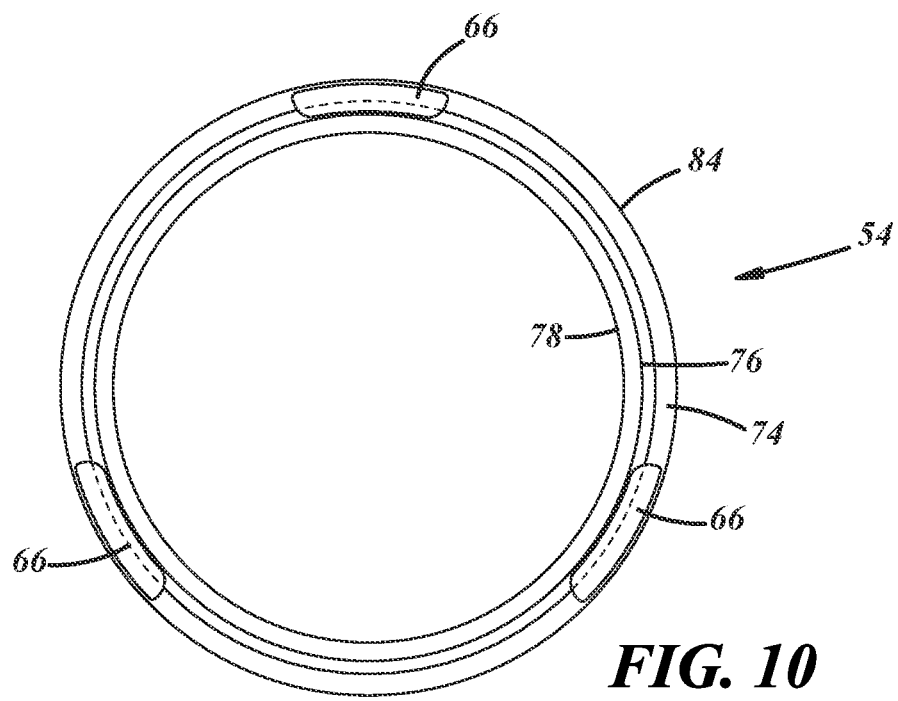
FIG. 10 is an end view of the plunger.

Referring again to FIG. 4, the front face 88 of the first body 74 may be axially inclined such that a radially outermost portion of the front face 88 is axially forward of a radially innermost portion of the front face. In at least some implementations, a radially outer portion 100 of the front face 88 is axially forward of a radially inner portion 102 of the front face 88, where: 1) the outer portion 100 includes the transition or junction 104 between the outer surface 84 and the front face 88 and extends toward a radial midpoint 106 between the outer surface 84 and the inner surface 80; and 2) the inner portion 102 extends between the inner surface 80 and extends to the midpoint 106. While the first body 74 is shown with a front face 88 that is linear from the outer surface 84 along a majority of the distance between the outer surface 84 and the inner surface 80 (e.g. from the outer surface 84 and beyond the midpoint 106), the front face 88 could be stepped, as generally shown in FIG. 8, curved, as generally shown in FIG. 9, or otherwise arranged with the upper portion of the front face axially offset and forward of the lower portion of the front face (where forward indicates a direction of movement of the plunger 54 and/or being closer to the clutch ring). Further, in the example shown, the inner portion 102 of the front face 88 includes a chamfer or beveled surface 108 extending from the inner surface 80 to the transition 110 located between the inner surface 80 and the midpoint 106, and arranged at a different angle than the remainder of the front face 88. This beveled surface 108 facilitates assembly of the plunger 54 and provides clearance from the back side of feet of the plunger feet 66.

Thus, the outer portion 100 of the front face 88 is axially overlapped more by the axially extending surface 92 than is the inner portion 102. In this way, the magnitude of the air gap 98 at the first position of the plunger 54 can be smaller than if the front face 88 were not axially inclined, and this can provide a higher initial magnetic force to the plunger 54 when the coil 49 is energized, while still providing a decreasing air gap 98, and thus, an increasing force on the plunger 54, as the plunger 54 is driven forward to move the clutch ring 56.

In at least some implementations, the outer surface 84 of the first body 74 in the nose portion 94 is radially tapered at an angle of between zero or 0.5 degrees and 30 degrees, and the front face 88 is inclined at an angle of between 0.1 degrees and 45 degrees relative to a radius, such as a radius extending to the radially outermost portion of the front face. In at least some implementations, the first body 74 has a radial thickness of between 1 mm and 10 mm, and part of the front face 88 between the midpoint 106 and the outer surface 84 axially leads the front face 88 at the transition 110. Further, with a length of travel of the plunger 54 of between 1 mm and 8 mm, the air gap 98 may be between 0.2 mm and 3 mm in the first position of the plunger 54 and between 0.05 mm and 2 mm in the second position of the plunger 54. In at least some implementations, the angle 112 of the front face 88 is greater than or equal to the taper angle 114 of the outer surface 84 in the nose portion 94 of the first body 74.

As shown in FIGS. 3 and 4, the differential housing 37 may include a recess 116 into which the front face 88 of the first body 74 is received when the plunger 54 is in the second position. The recess 116 is defined by a groove that extends circumferentially between adjacent apertures 64, is radially aligned with the first body 74 of the plunger 54, and is defined in part by an end wall 118 that is shaped and located to permit a full range of movement of the plunger 54. The end wall 118 has a radially outer surface 120 that is axially inclined or offset from a radially inner surface 122, and may be at an angle 124 that is the same or different than the front face 88 of the first body 74 of the plunger 54, or shaped the same as or differently than the front face 88. The recess 116 permits the plunger 54 to move through a longer stroke without interference to enable sufficient length of movement for positive engagement and disengagement of the clutch.

In commercial applications, the size constraints on the actuator 48 and differential are significant and can make it difficult to provide a suitable actuation stroke for the plunger with sufficient force from the coil 49. The forwardly inclined front face 88 of the plunger first body 74 enables a higher initial actuating force with at least part of the front face 88 overlapped by the differential housing 37 or at a smaller gap from the adjacent surface 92 of the housing 37 compared to a body having a radially extending front face (e.g. a front face that is not inclined relative to the radial direction, with a portion axially leading another portion). Further, the tapered nose portion 94 of the first body enables a decreasing gap 98 to be provided between the first body 74 and the differential housing 37 to provide an increasing actuation force along the stroke length of the plunger 54, so greater force is provided during the portion of the stroke in which the plunger 54 engages and displaces the clutch ring 56 (or other component driven by the plunger 54).

Further, the recess 116 in the differential housing can be provided radially offset and spaced from the surface 79 along which the plunger 54 moves, which may be along a wall or structure in which a sideshaft is partially received and adjacent to a side gear connected to the side shaft. This area of the differential housing 37 is subjected to higher loads in use and a recess in this area would not be desirable or would require the wall thickness overall to be increased which would increase the size and weight of the housing. Because the recess 116 is only needed for the first body 74 and not also the second body 76, the recess is spaced from the area of the differential housing that is under higher load in use and the recess is limited to an area of the differential housing 37 that is subjected to lower forces and which can tolerate the reduced material in the area of the recess. In this way, the differential housing 37 can be optimized while enabling improved performance of the actuator 48 and plunger 54.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A rotary power transmission device, comprising:
   a device housing having an interior in which multiple gears are received for rotation;
   a clutch received within the device housing and having a clutch ring selectively engageable with one of said multiple gears; and
   an actuator having a coil and a plunger driven for movement along an axis and relative to the clutch ring, the plunger has a first position in which the clutch ring is not engaged with said one of said multiple gears, and the plunger has a second position in which the clutch ring is engaged with said one of said multiple gears, and the plunger includes a first body formed at least partially from a first material that is magnetically responsive and a second body formed at least partially from a second material, and wherein the first body includes a radially outer surface, a radially inner surface and a front face that is axially variable and arranged so that a radially outer portion of the front face is axially forward of a radially inner portion of the front face, wherein the front face of the first body includes a nose portion that extends to the front face from a transition spaced axially from the front face, and wherein the radially outer surface in the nose portion is inclined toward the radially inner surface so that the radial dimension of the first body decreases from the transition to the front face.

2. The device of claim 1 wherein the device housing includes an axially extending surface arranged radially between the coil and the radially outer surface and axially overlapping at least part of the radially outer surface in all positions of the plunger.

3. The device of claim 2 wherein a gap between the radially outer surface and the axially extending surface decreases as the plunger moves toward the second position.

4. The device of claim 1 wherein the device housing includes a recess defined by an end wall, and wherein the front face of the first body is received in the recess when the plunger is in the second position.

5. The device of claim 4 wherein the end wall has a radially inner surface and a radially outer surface that is axially offset from the radially inner surface.

6. The device of claim 4 wherein the end wall defines part of a groove that extends circumferentially in the device housing.

7. The device of claim 4 wherein the device housing includes an annular surface and the second body includes a radially inner surface that is adjacent to and that slides along the annular surface when the plunger moves to and between the first position and the second position, and wherein the recess is radially offset from the annular surface.

8. The device of claim 1 wherein the second body includes axially extending feet having an axial end arranged to engage the clutch ring and the nose portion is axially spaced from the axial end of the feet so that the nose portion does not engage the clutch ring.

9. The device of claim 3 wherein the second body includes axially extending feet having an axial end arranged to engage the clutch ring and the nose portion is axially spaced from the axial end of the feet so that the nose portion does not engage the clutch ring.

10. The device of claim 1 wherein the nose portion is radially tapered at an angle between 0.5 degrees and 30 degrees.

11. The device of claim 1 wherein the front face is axially inclined at an angle between 0.1 degrees and 45 degrees relative to a radius extending to the radially outer portion of the front face.

12. The device of claim 11 wherein the front face is axially inclined at an angle between 0.1 degrees and 45 degrees relative to a radius extending to the radially outer portion of the front face.

13. A rotary power transmission device, comprising:
a device housing having an interior in which multiple gears are received for rotation, the device housing also has an annular surface and an axially extending surface arranged radially spaced from the annular surface;
a clutch received within the device housing and having a clutch ring selectively engageable with one of said multiple gears; and
an actuator having a coil and a plunger driven for movement along the annular surface and having an axis, the plunger is driven relative to the clutch ring and the plunger has a first position in which the clutch ring is not engaged with said one of said multiple gears, and the plunger has a second position in which the clutch ring is engaged with said one of said multiple gears, the plunger includes a first body formed at least partially from a first material that is magnetically responsive and a second body coupled to the first body and slidable along the annular surface, and wherein the first body includes a radially outer surface, a radially inner surface and a front face that is axially variable and arranged so that a radially outer portion of the front face is axially forward of a radially inner portion of the front face, wherein the front face of the first body includes a nose portion that extends along an axial extent of the first body to the front face, and wherein the radially outer surface in the nose portion is inclined toward the radially inner surface so that the radial dimension of the first body decreases toward the front face, and wherein the axially extending surface axially overlaps at least part of the radially outer surface of the plunger in all positions of the plunger.

14. The device of claim 13 wherein the front face of the first body includes a nose portion that extends to the front face from a transition spaced axially from the front face, and wherein the radially outer surface in the nose portion is inclined toward the radially inner surface so that the radial dimension of the first body decreases from the transition to the front face.

15. The device of claim 13 wherein the device housing includes a recess defined by an end wall, and wherein the front face of the first body is received in the recess when the plunger is in the second position.

16. The device of claim 15 wherein the end wall has a radially inner surface and a radially outer surface that is axially offset from the radially inner surface.

17. The device of claim 13 wherein the second body includes a radially inner surface that is adjacent to and that slides along the annular surface when the plunger moves to and between the first position and the second position, and wherein the recess is radially offset from the annular surface.

18. The device of claim 14 wherein the nose portion is radially tapered at an angle between 0.5 degrees and 30 degrees, and wherein the front face is axially inclined at an angle between 0.1 degrees and 45 degrees relative to a radius extending to the radially outer portion of the front face.

* * * * *